United States Patent [19]
Alt et al.

[11] Patent Number: 5,898,384
[45] Date of Patent: *Apr. 27, 1999

[54] PROGRAMMABLE REMOTE CONTROL SYSTEMS FOR ELECTRICAL APPARATUSES

[75] Inventors: Larry G. Alt, Crown Point; Robert C. Florin, Hammond; Joseph H. Little, Valparaiso; Richard C. Oesterle, Crown Point, all of Ind.

[73] Assignee: Profile Systems, LLC, Merrillville, Ind.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/585,245

[22] Filed: Dec. 22, 1995

Related U.S. Application Data

[63] Continuation of application No. 08/182,728, Jan. 14, 1994, abandoned, which is a continuation-in-part of application No. PCT/US93/03259, Apr. 7, 1993, abandoned, which is a continuation-in-part of application No. 07/865,108, Apr. 8, 1992, Pat. No. 5,254,908.

[30] Foreign Application Priority Data

Apr. 7, 1993 [MX] Mexico ................................ 93-2029

[51] Int. Cl.⁶ .................................................. H04Q 1/00
[52] U.S. Cl. .................... 340/825.36; 340/825.69; 340/825.72
[58] Field of Search ............. 340/825.22, 825.36, 340/825.44, 825.69, 825.72, 825.54

[56] References Cited

U.S. PATENT DOCUMENTS

| 4,208,630 | 6/1980 | Martinez | 340/825.72 |
| 4,279,012 | 7/1981 | Beckedorf | 340/825.22 |
| 4,342,986 | 8/1982 | Buskirk | 340/825.54 |
| 4,454,509 | 6/1984 | Buennagel | 340/825.69 |
| 4,962,522 | 10/1990 | Marian | 340/825.44 |
| 5,089,814 | 2/1992 | Deluca | 340/825.44 |

*Primary Examiner*—Brian Zimmerman
*Attorney, Agent, or Firm*—Lockwood, Alex, FitzGibbon & Cummings

[57] ABSTRACT

A control system for remotely controlling the application of electric power to a plurality of electrical apparatuses (10) includes a radio transmitting device (20) at a central location, and a radio receiving device (22) and a control unit (16) at each electrical apparatus location. During set-up of an electrical apparatus, programming signals designating the operating protocol or mode and the location of the electrical apparatus are transmitted by a radio programming signal to the control unit (16) associated with each electrical apparatus. Subsequently, timing reference signals containing a multiple-digit computer generated code designating the time of day and the time of sunrise and sunset on a particular day within particular latitudinal zones are transmitted by radio to the control units (16) of all electrical apparatus (10). Each control unit interprets and responds to the timing signals in accordance with previously received programming signals to control the application of electric power to the electrical apparatus in accordance with a predetermined operating protocol. Each control unit is also provided with a two way communication answer back capability to advise the control command center that previously sent messages have been received and to provide status report information.

35 Claims, 7 Drawing Sheets

PROGRAMMABLE REMOTE CONTROL SYSTEMS FOR ELECTRICAL APPARATUSES

CROSS-REFERENCE TO RELATED APPLICATIONS

This application is a continuation of application Ser. No. 08/182,728, filed Jan. 14, 1994 now abandoned which is a Continuation-In-Part of our pending prior PCT Application, International Application No. PCT/US93/03259, filed Apr. 7, 1993, designating the U.S., which is in turn a Continuation-In-Part of prior U.S. patent application, Ser. No. 865,108, filed Apr. 8, 1992, now U.S. Pat. No. 5,254,908, granted Oct. 19, 1993.

BACKGROUND OF THE INVENTION

The present invention generally relates to electronic control systems for controlling a population of similar, generally independently operated devices. More particularly, it relates to remote control systems for controlling a plurality of electrical devices or apparatuses wherein programming and reference instructions are transmitted to remote, geographically diverse, individual control units, generally provided for each device, so that each individual device may be operated in accordance with predetermined protocols or in accordance with a programmable protocol and wherein the control units are each provided with answer back communication ability to apprise the central command control regarding the communications and operations status of each control unit.

There are many requirements for control systems capable of individually controlling a population of electrical devices in accordance with desired predetermined operating protocols or modes. Control systems may optimize the efficiency of the overall network or population of devices and dramatically reduce energy consumption. Illustrative control systems of the type for controlling a population of devices may include, for example, lighting systems, climate control systems, irrigation/watering systems and traffic control systems, to name but a few. The desired operating protocols implemented by the control system may require the individual devices to operate at designated on-and-off times with respect to a particular time of day, as well as with respect to the length of day, e.g., with respect to sunset or sunrise for the particular geographic location in which the individual electrical device or apparatus is located.

In the following discussion, a new and improved system for controlling a population of individual electrical devices is described with special reference to a preferred context and preferred embodiment relating to lighting of sign boards. Although the invention is described in this context, the new and improved control devices, methods and systems in accordance with this invention are also well suited to other end use environments in lighting applications, in non-lighting applications for climate control, irrigation control, in traffic control and in manufacturing and production applications. Sign board lighting systems are a preferred use relied upon for purposes of illustration and explanation and the invention should not be construed as being limited thereto.

Another example of a system or population of separate devices which is preferably overseen by a common control is a traffic control system. For example, overhead road signs which indicate proper lanes for travel during rush hour may need to be changed to indicate different lane configurations from morning rush hour to evening rush hour. Overhead signs indicating roadway conditions up ahead, indicating delays due to heavy traffic, accidents, weather or construction and the like, possibly indicating alternate routes, may frequently need to be changed. On non-highway streets, the timing of traffic lights may need to be varied at different times of day. For example, on main roads entering or leaving a downtown area, traffic signals may have their timing altered to provide a prolonged green light favoring the direction of heaviest traffic volume. It may be beneficial at rush hour to synchronize a group of adjacent traffic signals to promote maximum flow. It may also be helpful for the prolonged green light signal command to move along a main street with a surge in rush hour traffic. More particularly, at the beginning of rush hour, traffic lights along a major exit route may be changed to provide a span of synchronized long green lights to facilitate faster egress from the city. After the first fifteen minutes, the main surge in traffic volume may now be located at about 10 miles out of the city along the roadway. The lights at this 10–15 mile distance may now be changed to the prolonged green lights and the system may restore the inner city traffic lights back to their normal signal changing cadence or period.

Another example of a control system for controlling a population of individual devices for which the system of this invention may be used may include an irrigation system. In a given irrigation system including a plurality of irrigation booms, it may be necessary or desirable to water crops or lawns after dark to reduce or eliminate water loss due to evaporation. Moreover, it may be important to commence irrigation as soon after sundown as possible to provide maximum soak-in times without evaporation. It may also be important to shut off the water system to prevent overwatering, super-saturation, undesirable flooding or erosion from occurring. Furthermore, watering may need to be performed intermittently, in timed pulses or dosages throughout the hours of darkness for maximum efficiency.

Another example may include a climate control system for a commercial office space, hotel, store or the like, wherein different climate controlled rooms or zones may vary in their heating or cooling requirements depending on their exposure to the sun at various times of day or to their relative zone or room sizes. For example, in the morning, if the outside temperature rises about 75° F., a control system may be needed which turns on the cooling system for a large 2,000 square foot room earlier than a that for a small 300 square foot office to promote efficient energy use in readying the building at the beginning of the business day.

Another control system may be a controller for causing a population of insecticide sprayers to dispense a spray of insecticide approximately at dusk and periodically thereafter at an amusement park, zoo, or other public place.

Lighting systems provide perhaps the most widespread and easily understood application of population control systems. Remote airports, in order to qualify with FAA regulations, or to be entitled to Federal funds, for example, may be required to burn or illuminate runway lights for a time period extending from just before dusk to a couple of hours after sundown. To conserve energy, highway interchanges including intersections, entrance ramps and exit ramps may only need to be illuminated for a time period after dark and then again for a period before dawn, instead of all night long. If the on and off times for highway street lamps are carefully controlled to follow the time of sunset and the time of sunrise at a given location instead of a general time of day on the clock, better lighting and energy savings may also be achieved.

In certain agricultural applications, providing artificial lighting at carefully controlled lighted times, in horticultural and animal environments, such as in a hen house, may promote health, or food production, or both.

The present invention relates to control systems, and more particularly to a system whereby programming and reference instructions are conveyed to remote and geographically diverse, individual control units by means of radio transmissions such that the electrical apparatus to be controlled by such units operate in accordance with predetermined operating protocols or modes. The invention allows the operating protocols or modes to be defined with respect to particular times of each day as well as the time of sunset or sunrise for the particular geographic location at which the apparatus is located.

Sign board lighting systems have come into wide use for illuminating outdoor billboards and the like during the time period between sunset and sunrise. Sign boards which require such illumination exist in very diverse locations, such as along highways or on buildings, and often in very remote places. Moreover, sign boards owned and maintained by a major outdoor advertising company can be located hundreds, or even thousands, of miles apart.

Because it is neither necessary nor desirable to continuously illuminate sign boards, sign board lighting systems are operated only during certain, discreet time periods, or in accordance with predetermined lighting protocols. Typically, such lighting protocols are established by contract between an advertiser and the sign board owner, and may, for example, be from sunset to sunrise or from sunset until a certain specified time at night. By accurately conforming the time period during which the lighting system is activated to the protocol required by the contract, the particular location or application, significant savings are realized from decreased electrical power consumption and extended lamp life.

Prior systems for controlling sign board lighting typically utilized photocells, timers or a combination thereof, to regulate the lighting circuitry. Because of inherent deficiencies in these designs, the operation of such sign board lighting control systems was often less than optimum.

For example, since the time of sunset at a particular sign board location varies on a daily basis and therefore cannot be readily established with a conventional timer, photocells were often utilized to activate a sign board lighting system at sunset. However, the photocells proved to be a crude means of determining the time of sunset, because variations in atmospheric conditions caused the light intensity measured by the photocells at the time of actual sunset to fluctuate dramatically. Thus, on cloudy days such systems would sometimes illuminate the sign board long before sunset. This was an even greater problem in areas where the photocell lens became dirty or otherwise obstructed with time.

Often it is required to alter the lighting protocol of a particular signboard, i.e., to change the times each day when the lighting system is to be activated or deactivated. For example, it is common for a contract to require that the sign board lighting system be deactivated at a particular local time each day. In such a case, upon a time change from "standard time" to "daylight savings time," or vice-versa, the mode of operation of the sign board lighting system must be altered to account for the hour time change. Or, for example, the advertiser contracting for the sign board may decide that the sign should remain illuminated to a later time, say midnight instead of 10 p.m. Or, upon the expiration of the advertising contract, the owner of the sign board may wish to completely discontinue illuminating the sign board until a new advertiser is secured.

In order to alter the lighting protocol of prior sign board illumination systems it was necessary for a repair crew to visit the sign board and control unit site. Because of the diverse, remote and often virtually inaccessible location of many sign boards, this was often an arduous, time-consuming and expensive task.

Certain prior sign board lighting control systems utilized radio transmissions to actuate the systems. The sign boards were categorized into groups of one or more sign boards and turned on or off as a group in response to radio signals. Where a large number of geographically separated sign boards exist, such systems are not practical because of the high cost and time required to send individual radio signals to each sign board or group of sign boards. Moreover, as with sign boards controlled by photocells and timers, such prior sign board lighting control systems did not provide the capability to remotely program the lighting protocol of individual sign boards.

It has been proposed that a control system be developed whereby individual sign boards may be controlled by radio signals. However, such a system would prove unduly expensive because major sign board companies own thousands of sign boards. Since each individual electrical apparatus would require its own transmissions, an excessive number of transmissions would be necessary to effectively control the system.

The present invention overcomes these drawbacks by providing a system whereby both programming and timing signals are communicated to a control unit associated with an electrical apparatus, such as a sign board lighting control device. In particular, the invention provides for transmissions of coded programming signals which designate a particular lighting or operating protocol to a particular sign board or apparatus. Additionally, the invention provides for timing signals necessary for performing the various different lighting protocols of multiple sign boards to be accomplished by a limited number of universal reference transmissions received by all sign boards.

A control unit associated with an individual sign board lighting system includes a receiver capable of intercepting the radio-transmitted coded programming and timing signals and control circuitry capable of decoding such signals and either storing in memory programming signals or executing functions in response to timing reference signals, or executing functions in response to programming signals, or both as the case may be.

Since the control system is able to reference sunset and sunrise at specific geographic locations, outdoor lighting systems are particularly obvious applications of the invention. However, many other applications, including apparatus which operate without reference to sunset or sunrise would benefit from the present invention. Such applications would benefit from both the timing features as well as the remote programmability of the invention.

Accordingly, it is a general object of the present invention to provide a new and improved control system for electrical apparatus.

It is another object of the present invention to provide a new and improved control system for lighting systems and other electrical apparatus wherein the system comprises a computer controlled radio frequency transmitter for transmitting coded programming and timing reference signals to a population of radio frequency receivers associated with individual control units, which signals are utilized by the control units to activate or deactivate the lighting system or electrical apparatus in response to the coded signals, thus providing remote programming capability which eliminates the need for "on-site" programming.

It is a further object of the present invention to provide a new and improved control system for a variety of electrical apparatus whereby commercially available "paging" or "beeper" or two way radio systems transmit coded programming or timing reference signals to control units associated with each electrical apparatus. The control units decode the signals and activate or deactivate the electrical apparatus in accordance with the programming and timing reference signals.

It is another object of the present invention to provide a new and improved control system for sign board lighting systems and the like.

It is a further object of the present invention to provide a new and improved control system for remotely controlling a population of electrical apparatuses so that each apparatus operates in accordance with an assigned protocol which also includes a two way communication capability from each apparatus to a command control center so that operation of the apparatus is remotely verifiable.

It is still another object of the present invention to provide an interactive remote control system for electrical apparatus, wherein data from diverse apparatus locations may be communicated back to the command control center including answer back messages which acknowledge receipt of control transmissions; verify implementation of changes in protocol programming messages received; provide apparatus status reports and operating conditions, and the like.

SUMMARY OF THE INVENTION

In accordance with these and other objects, the present invention provides a new and improved a system for controlling the application of electric power to a plurality of electrical devices or apparatuses so that each of said devices functions or operates in accordance with a predetermined operating protocol requiring predetermined on and off times. The control system comprises a transmission means for transmitting a timing reference signal, a control unit associated with each of the electrical apparatus, each control unit including a receiver means for receiving the transmitted timing reference signal, a timing means responsive to the received timing reference signal for initiating a timing period, a control circuit means responsive to the timing means for controlling the application of operating current to the electrical apparatus following the timing period, a control unit response transmitter operable to selectively transmit at least one answer back message at an assigned time in response to a received reference signal to a receiving unit associated with a system control command center, whereby each said electrical apparatus is verifiably operated in accordance with its respective assigned operating protocol.

The invention is further directed to a control device operable from a received timing reference signal for controlling the application of electric power to an electrical apparatus in accordance with a predetermined operating protocol requiring predetermined on and off times comprising a radio receiver means for receiving the reference signal, timing means responsive to the received reference signal for initiating a predetermined timing period and a control circuit means responsive to the timing means for controlling the application of operating current to the electrical apparatus following the timing period whereby the electrical apparatus is supplied electric power in accordance with its operating protocol.

The invention is further directed to a method for controlling the application of electric power to a selected one of a plurality of electrical apparatus in accordance with a predetermined operating protocol requiring predetermined on and off times comprising transmitting a reference signal to all of the plurality of electrical apparatus, receiving the transmitted reference signal at the selected electrical apparatus, initiating a timing period at the selected electrical apparatus in response to the received reference signal and controlling the application of operating current to the electrical apparatus following the timing period whereby the selected electrical apparatus is caused to be supplied electric power in accordance with the predetermined operating protocol.

In accordance with a preferred embodiment, the invention is directed to a system for controlling the illumination of a plurality of sign boards in accordance with a predetermined lighting protocol requiring predetermined on and off times, to a lighting control device operable from a received reference signal for controlling the illumination of a sign board in accordance with a predetermined lighting protocol requiring predetermined on and off times and to a method for controlling the illumination of a selected one of a plurality of sign boards in accordance with a predetermined lighting protocol requiring predetermined on and off times.

The present invention also relates to improved control systems including two-way communications capabilities, wherein the individual control units associated with each electrical apparatus being controlled are provided with answer back capabilities. Accordingly, an operation control unit includes means for polling, at either preset times or upon demand, several channels or inputs at an associated remote electrical apparatus site. These inputs provide responsive data that is processed by the control unit. The input may be in the form of a "state", e.g., open or closed, or may be in the form of a numeric value, e.g. 30 amps. The control unit is operable and programmed to determine whether the input data would require answer back transmission to a command control center or not, based upon preset conditions, parameters or answer back criteria. If the control unit determines that answer back transmission is required, the input data is encoded and a unique serial number identifier for that control unit and apparatus is attached to each data string. The answer back transmitters provided on each electrical apparatus may send the answer back messages by a suitable communications link to the command control center directly, or indirectly to a regional relay station, which in turn forwards the answer back messages to the command control center or host computer. The answer back messages have their unique serial number address identifiers imbedded in each message. The control command center removes the serial number from the message, decodes the message into an appropriate, readable format and communicates the message to the customer or owner of the device or apparatus answering by a same or different type of communications link. Suitable forms of communications links may include: radio, paging, telephone, modem and fax type communications links. The answer back messages may be transmitted from individual control units to a relay station by telephone for example and communications from the relay station to the command control center may be by telephone, computer modem or satellite paging.

The control units associated with each electrical apparatus in accordance with this preferred embodiment can transmit autodiagnostic status report data in the answer back messages. These status report components of the answer back messages may include such information or data as: an acknowledgement of receipt of a new program; the times the device, such as billboard lights, were turned on and off during the past 24 hours; a burned out light bulb condition;

a tripped circuit breaker condition; a loose billboard face; an electrical meter reading, provided selectively every so many days, or upon demand; a "count" provided by a proximity or other sensor, for example, useful to count the number of vehicles passing by a given billboard location in a particular time period; and the ambient temperature and/or other weather conditions at the location. The nature of the answer back message data is almost limitless. Although these data examples relate to sign board lighting embodiments, similar applications involving other control systems and electrical apparatuses should be readily apparent to those skilled in this art.

By way of further illustration, in accordance with the preferred two-way paging embodiment, in addition to a reference signal being transmitted from a command control center to indicate the time of sunrise or sunset at a particular geographic location, another command signal can be transmitted system-wide directing each control unit to conduct an autodiagnostic check of its associated electrical apparatus.

Each control unit may be programmed upon receipt of the status check polling signal to perform a diagnostic subroutine to check the operating condition of several operational elements or functions associated with the device. The answers to the status inquiry check may be stored for transmission back to the command control center. The individual control units may be programmed to respond to a second timing period before transmitting their answer back message to command control. In accordance with this aspect, the individual control units may be permitted to send their status information after a certain period of time has elapsed from the system wide, universal, status poll signal. Only those units discovering a problem with their associated electrical apparatus will answer back and they will answer back at a staggered, designated elapsed time after the control poll signal. The elapsed time period for each answer back transmission may be selected so that it is related to the geographical location of the control unit, for example. In this manner the system control pulse goes out over the system and the timing of the answer back message as well as the address serial number identifies the particular electrical apparatus. Moreover, this staggered system for answer back transmissions, prevents a communication overload from occurring at the receiver unit of the command control center, which might be caused by all the remote control units attempting to answer the system status check all at the same time.

In accordance with a preferred embodiment of the invention, a population of electrical apparatuses, such as sign boards, parking lot flood lights at fast food restaurants, and the like, may be verifiably controlled from a central set of instructions and from a central set of instructions and from a command control center to provide improved on/off times and operational control to yield substantial overall energy savings. In accordance with the improved system provided by this invention, a plurality of customer subscribers may be communicatively linked to a command control center. The command control center coordinates the instructions of each subscriber regarding their respective desires and protocols for operation of their respective populations of electrically-controllable devices or apparatuses.

The Command Control Center formulates the command signals and delivers large numbers of command control packages containing one or more command signals or messages in the form of reference signals, programming signals, or combinations of both types of signals to a gateway facility. The gateway communicates or relays the individual messages contained in all bundles or packets of signals and arranges for each message signal to be transmitted to an uplink facility for uplinking to a satellite. The satellite receives and re-directs the signals to regional transceivers, which in turn, transmit the messages to the individual control units via paging or two-way radio. The control units in the preferred embodiment have answer-back transmission capabilities. Answer-back messages are received by regional relay transceiver facilities which communicate the answer-back messages to the gateway facility. The gateway facility communicates large volumes of answer-back message data back to the command control center. The command control center differentiates and decodes the answer-back messages and communicates any necessary messages from individual controlled units back to the owner/subscriber of that unit. The command control center is responsible for formulating appropriate command control signals to go out and for receiving and decoding all answer-back messages back to the individual subscribers. In this connection, the command control center may communicate status information provided in an answer-back message back to some subscribers by computer modem, to others by fax message and to still others by a telephone call.

In greater detail, in accordance with this improved embodiment, a system-wide polling message may be sent from command control through the gateway system to the individual control units associated with the individual apparatuses being controlled. The system may be designed to transmit and receive answer-back messages in any one of a number of ways. For example, in response to a system-wide status control check paging signal, each individual control unit may contain instructions such that an answer-back message is prepared and transmitted only if a problem is detected when the unit performs its status check subroutines. Alternatively, an all-system status check may be employed wherein each unit is instructed to answer back. The answer-back messages may be staggered in time according to programming based on a reference pulse signal or the status poll signal or time of day, for example. Moreover, the answer-back message may be short in terms of bits or content of information, i.e., a simply "I'm OK" or "I'm not OK" message may be answered back. Thereafter, follow-up communications between the control center and that particular unit may be performed to determine the actual operating status and problem.

In still another arrangement, status checks may be ordered by a particular subscriber regarding its population subset of control units. In this regard, the owner may instruct that a special poll of only its units be made, or a poll of only its units in a geographical location, such as a city or state, or in a given longitude and latitude zone.

In other instances, wherein a subscriber desires to send out new programming information to change the programming and operating protocols of its individual units, the answer-back message may be programmed to identify how much of the transmitted information was received by the control unit, i.e., the answer back message may state, "I received five pages of Information" or "I received four packets of data", or the like. In this manner, the answer-back message confirms operation of the device and receipt of all information sent. If five packets of message signals were sent, and a unit only confirms receipt of four packets, transmission of the missing packet or re-transmission of all five packets to that unit may be provided.

In accordance with the preferred embodiment, each control unit is preferably provided with a battery or large capacitor capable of supplying sufficient power back-up to the control unit to send out at least one answer-back message, in the event of a unit failure. For example, if a circuit breaker is tripped on the unit in the field or a power interruption or outage occurs, the control unit is preferably programmed to send a final answer back message in the form of a distress signal to be communicated back to command control. For sending the last gasp message, the control unit relies on either the capacitor or battery or other external source of power to send the distress signal when it detects a loss of regular AC power to the device.

As will be appreciated, answer-back messages may be short as mentioned above or they may be larger, containing strings of actual data. Moreover, different forms of communications links may be employed between different centers or facilities within the overall system. The communications between the command center and gateway facility may be any suitable link for communicating data reliably, but preferably comprise computer modem connections. Gateway communications to the satellite uplink station may be by telephone. The link between a regional satellite receiver cell and the individual control units may be by paging or two-way radio and the answer-back messaging to the relay, as well. The communications link between the answer-back relay and the gateway facility may be by landline or radio.

Other objects and advantages of the present invention will become apparent from the following Detailed Description of the invention, taken in conjunction with the Drawings, in which:

DETAILED DESCRIPTION OF THE PREFERRED EMBODIMENTS

Figure 1:
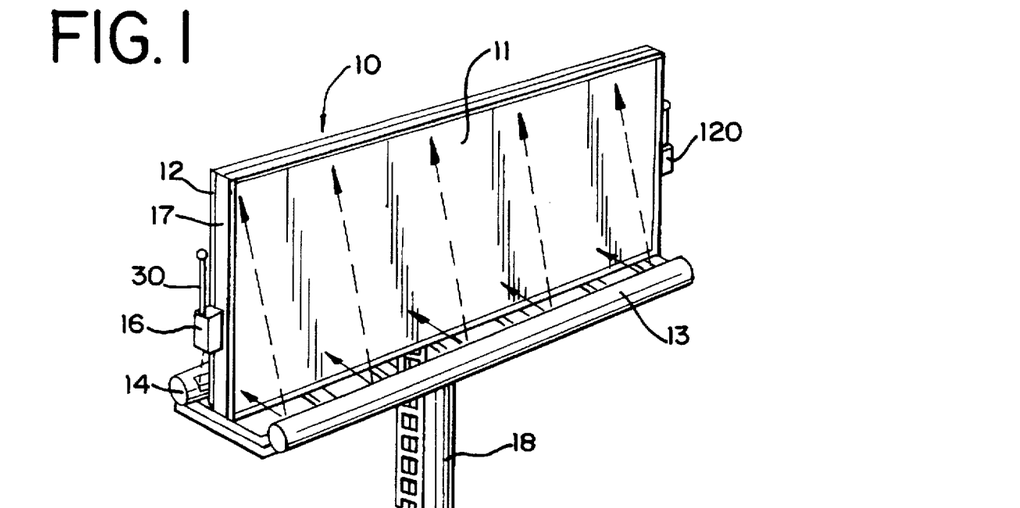
FIG. 1 is a perspective view of a two-sided sign board showing a control unit constructed in accordance with the invention for controlling lighting systems positioned to illuminate respective sides of the sign board.

Referring now to FIG. 1, a two face sign board 10 has a first face 11 and an oppositely facing second face 12. The two faces are individually illuminated by first and second lighting systems 13 and 14 operated from a conventional AC power source. The operation of lighting systems 13 and 14 is controlled by a sign board control unit 16 mounted on a side panel 17 of the sign board. A conventional mast 18 supports the sign board in a desired viewing position.

Control unit 16, in response to received programming and reference signals, causes each face of signboard 10 to independently operate in one of five lighting protocols:

1. A "10:00 p.m. off" protocol wherein the face is lighted daily from local sunset to 10:00 p.m., local time.
2. A "12:00 a.m. off" protocol wherein the face is lighted daily from local sunset to 12:00 a.m., local time.
3. A "2:00 a.m. off" protocol wherein the face is lighted daily from local sunset to 2:00 a.m., local time.
4. A "5:00 a.m. on" protocol wherein, in addition to one of the above three protocols, the face is lighted daily from 5:00 a.m. to local sunrise.
5. A "sunrise off" protocol wherein the face is lighted daily from local sunset to local sunrise.

In addition to the above protocols, control unit 16 functions in the following operating modes:

1. "Lock"—wherein the face is not lit, regardless of the programmed lighting protocol.
2. "Unlock"—wherein the "lock" mode is reset and the sign is lit in accordance with a programmed lighting protocol.
3. "Reset 5:00 a.m."—wherein the "5:00 a.m. on" mode is discontinued and the sign is lit in accordance with a programmed lighting protocol.
4. "Reset service lights"—wherein sign board lights, previously activated locally by a maintenance crew, are remotely reset to an off state.

Control unit 16 may be conditioned to operate in one or more of these modes or lighting protocols. Thus, for example, the 10:00 p.m. off and 5:00 a.m. on modes may together operate to activate one or both of the lighting systems at sunset and deactivate the systems at 10:00 p.m., after which the 5:00 a.m. on mode activates the lighting systems at 5:00 a.m. and deactivates the systems at sunrise. Although the invention provides five exemplary lighting protocols, it will be appreciated that a greater or lesser number of different lighting protocols can be provided. For example, additional 11 p.m. off and 6 a.m. on protocols, or any other times, could obviously be utilized in accordance with this invention.

In response to the "sunrise off" protocol, control unit 16 actuates the lighting systems at local sunset and deactivates the lighting systems at local sunrise. Unlike the "5:00 a.m. on" protocol, the "sunrise off" protocol does not operate in conjunction with other protocols, and thus overrides any other protocol that provides that control unit 16 will deactivate the lighting systems at any other time.

In the five lighting protocols, the first face 11 and the second face 12 of sign board 10 can be programmed to operate independently in different modes. Although the faces of sign board 10 can be separately programmed, to avoid unnecessary complication the two faces will be henceforth treated as being identically programmed.

In the five operating protocols, the primary and secondary systems can be programmed to operate independently in different modes. Although the primary and secondary systems can be separately programmed, to avoid unnecessary complication the two systems will be henceforth treated as being identically programmed.

In "reset service lights" mode, control unit resets the service lights associated with sign board 10. This mode of operation is used primarily for testing purposes. If an "on site" repair of any kind is necessary for any reason, the service lights are manually activated by the repair crew at the sign board site. Once finished with whatever work is required, a remote transmission encoding the "reset service lights" mode is transmitted to turn off the lighting systems. The crew at the site can then verify that the radio programming system is operational by observing that the service lights are deactivated.

The present invention relies on certain programming signals, directed to each individual board as required, to establish the lighting protocol and required operating parameters for each board; and certain reference signals, sent daily at certain reference times and reference events, such as sunset at a reference location, to cause the lighting control units 16 associated with a large number of sign board at diverse and widely divergent locations to operate in accordance with individual protocols assigned to each sign.

Figure 2:
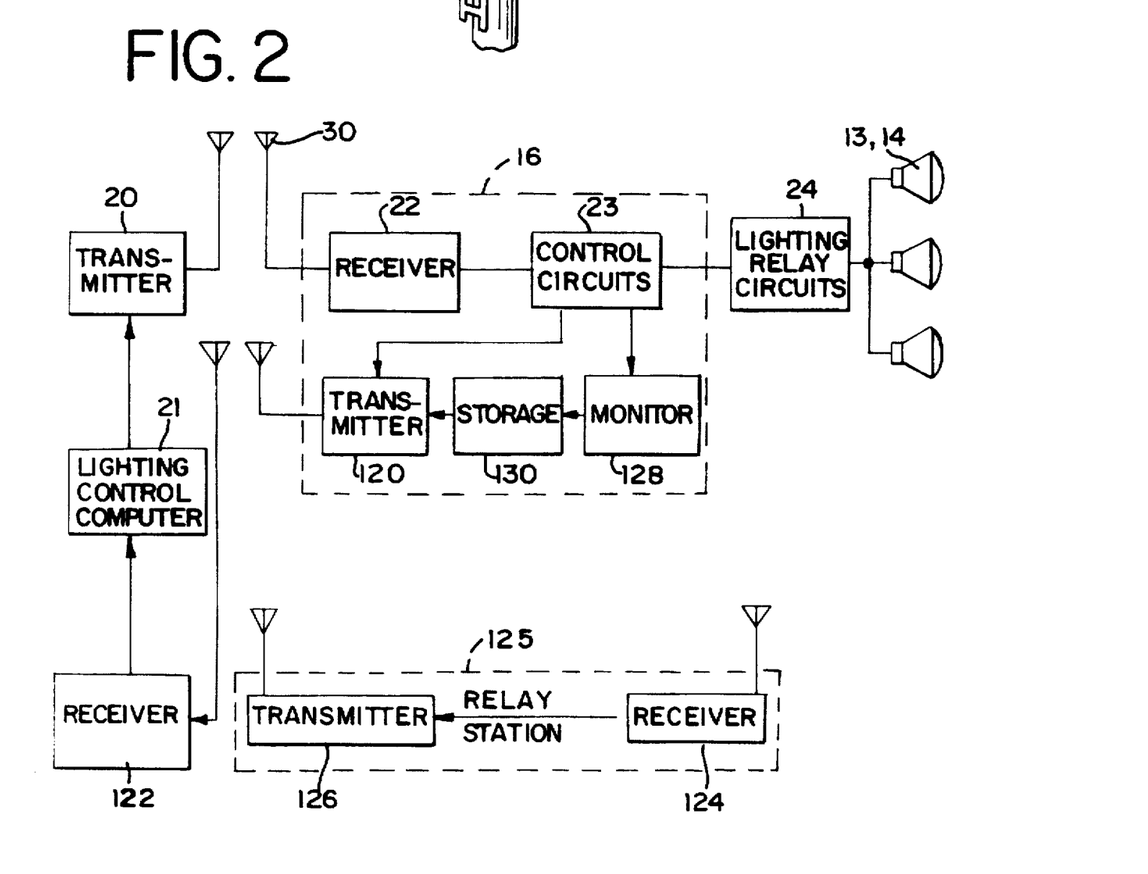
FIG. 2 is a simplified functional block diagram of the sign board lighting control system equipped with the preferred two-way communications ability.

Referring to FIG. 2, required programming and timing reference signals are conveyed to control unit 16 by a radio transmitter 20 operating under the control of a lighting control computer 21 at a system control center, and a radio receiver 22 within the sign board control unit 16. The control computer 21 may be linked via modem or some other means to computer systems operated by clients (not shown). In this manner, individual clients may have direct access to alter the operating protocol of their apparatus, but the system owner would still retain ultimate control over the operation of the system, and would, at its option, have the capability of limiting access to the system by individual users. This would be especially desirable if certain users would be delinquent in paying their subscription fees.

The transmitter 20 and receiver 22 preferably operate on a single predetermined frequency, and may, preferably, comprise part of a satellite personal paging or two way radio system. As such, the radio receiver 22 may be a commercially available paging or "beeper" or two-way radio receiver and may, with the exception of its data output circuitry, be conventional in design and construction. Typically, such paging or two way radio or "beeper" receivers operate by monitoring broadcasts on their assigned frequency for an individually assigned cap code. This cap code signals the particular receiver that the transmitter information bearing the cap code is intended for its reception.

Within control unit 16, receiver 22 is connected to control circuits 23, which utilize received information in conjunction with an internal timing reference to provide reference signals to a lighting relay circuit 24, which controls the application of power to the lighting systems 13 and 14 of sign board 10.

Figure 3:
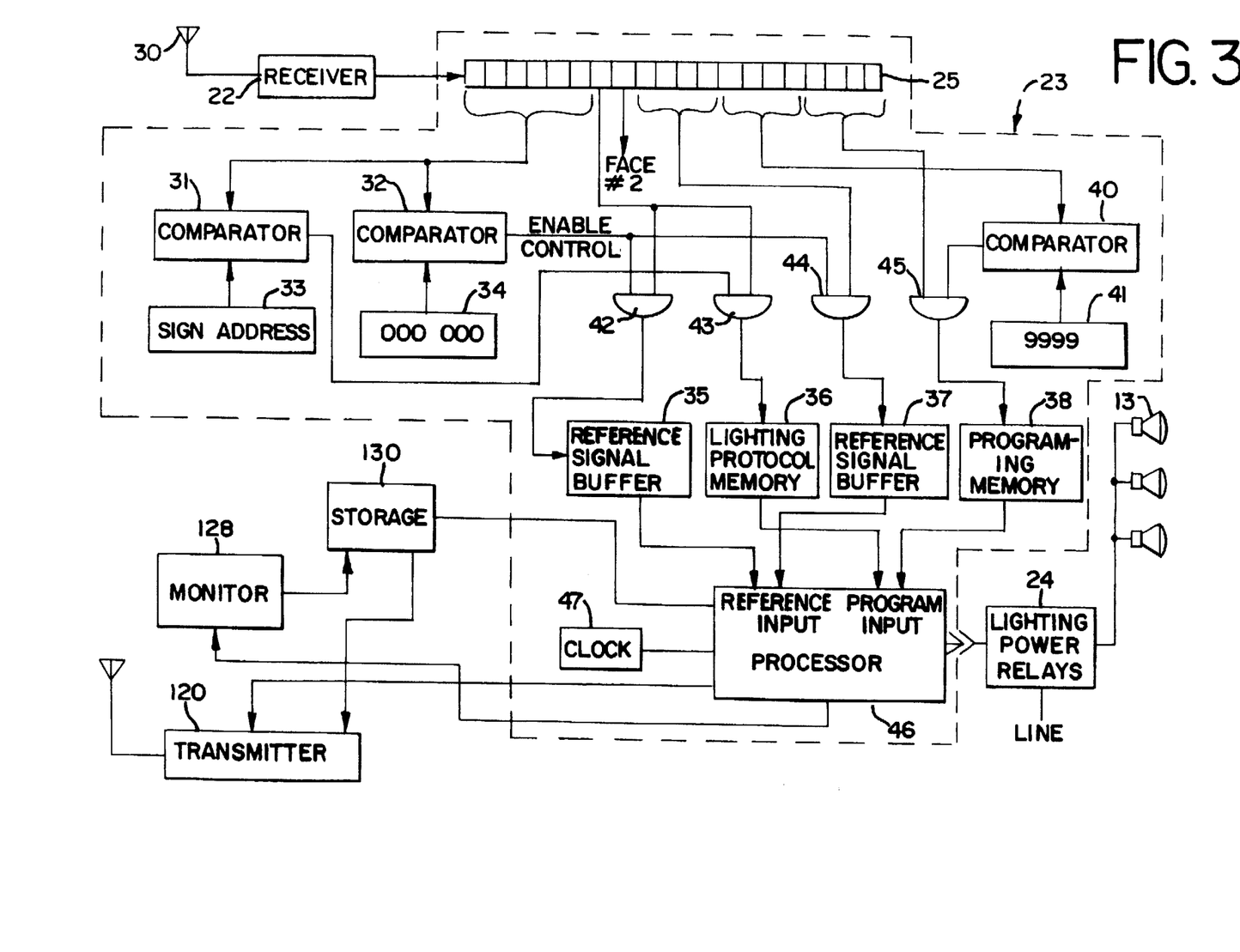
FIG. 3 is a simplified functional block diagram of the control unit shown in FIGS. 1–2.

In accordance with the preferred embodiment depicted in FIGS. 2-3, control unit 16 is provided with two way answer back capabilities in the form of an answer back message transmitter or response transmitter 120 which is under the control of control circuits 23. Transmitter 120 may communicate answer back messages directly to a command control center receiving unit 122 or, in the alternative, one or more local control units may utilize their respective control unit response transmitters 120 to forward their answer back messages to a regional relay station 125, including a relay receiver 124 for receiving the answer back messages and a relay transmitter 126 which relays the answer back messages to the command center receiving unit 122.

Various monitors and sensors indicated by reference numeral 128 may be located at the site of the electrical apparatus which may be interactively connected to or controlled by control circuits 23. Illustrative examples may include diagnostic circuit devices and meters for testing the condition of various circuits or circuit elements, such as voltmeters, ammeters and the like. Proximity sensors may be used, for example, to note a total number of passing vehicles adjacent a particular billboard location. Various meters for reporting electrical usage, temperature conditions, wind conditions, relative humidity, inches of rainfall and the like may also be included. These various meters, sensors and diagnostic devices may comprise inputs which may be polled or screened by the control circuits 23 to provide data which may be included in an answer back message to be sent by the response transmitter 120. Temporary data storage for component portions of the answer back messages in the form of a memory storage device 130 may be present in the control unit 16 at each apparatus site, or may be present at the relay station 125, or both.

Although a radio paging communications link is indicated between response transmitter(s) 120 and command center receiving unit 122, as well as, between response transmitter (s) 120 and relay receiver 124 and between relay transmitter (s) 126 and command center receiver unit 122, other forms of making a communications link might be employed. The communications links between the individual control units 16 and relay station 125 may be the same as the links between relay stations 125 and the command control center receiver 122 or they may be different. The answer back messages typically are transmitted at a different frequency than the system control signals are sent on but their coded digitized character may otherwise generally be substantially the same.

Figure 4:
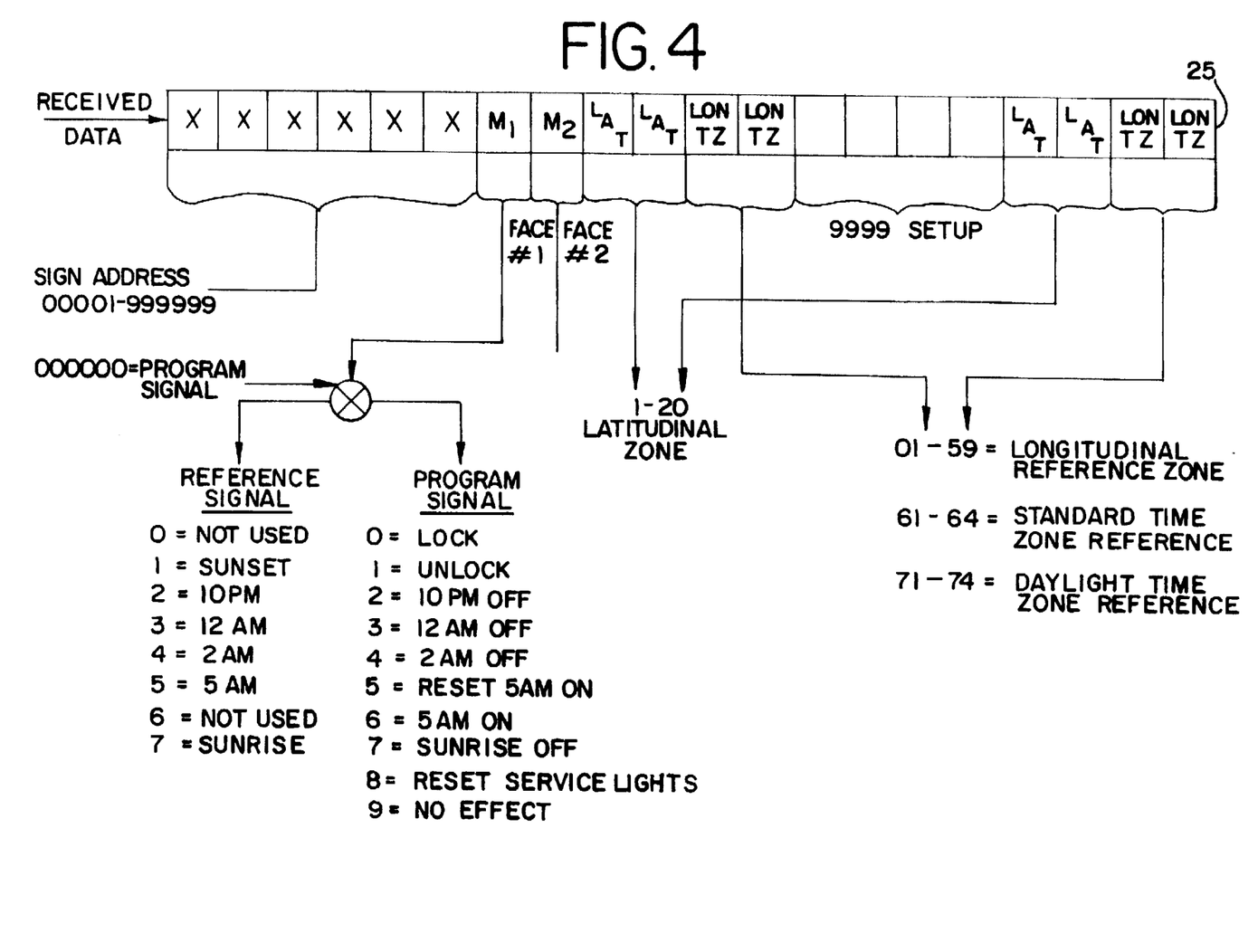
FIG. 4 is a diagram depicting the function of each digit in an exemplary twenty-digit code segment utilized in the lighting control system of FIG. 2.

The illustrated embodiment of the invention utilizes the conventional paging or "beeper" receiver to receive broadcasts of coded reference and programming signals, each represented by a twenty-digit number in a register 25 as shown in FIGS. 3 and 4. The timing reference signal is transmitted in response to computer 21 which signals transmitter 20 to transmit signals at predetermined times.

The transmission means typically relay their transmissions via satellites in order to effectively transmit throughout the United States, although the invention can also successfully utilize local paging or two way radio services. Although the invention utilizes a conventional commercially available paging or two way radio transmission 20 and receiving means 22, it will be appreciated that any other type of radio transmission means, including, for example, cellular telephone communications systems, may also be successfully utilized.

Because the time of sunset and sunrise vary with respect to both longitudinal and latitudinal geographic position, to accurately perform the lighting protocols required action at local sunset and local sunrise it is necessary to establish the geographic location of each sign board.

Figure 5:
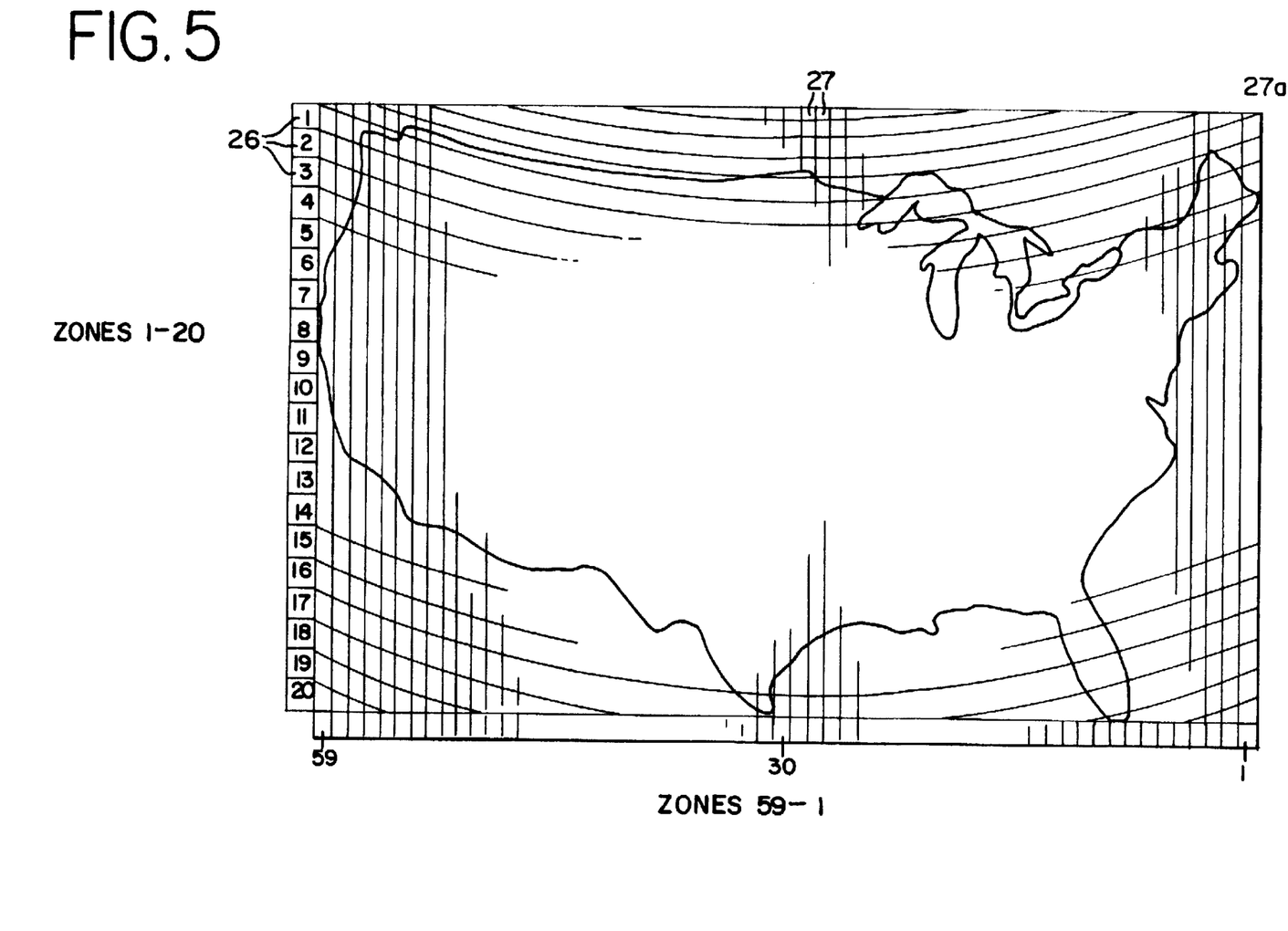
FIG. 5 is a depiction of the continental United States, whereupon a grid is imposed representing particular zones of certain longitudinal dimension and zones of certain latitudinal dimension defining geographic zones in which particular sign boards may be located.

Referring to FIG. 5, the continental United States may be divided into a number of zones of a certain latitudinal dimension 26 and a number of zones of a certain longitudinal dimension 27. Although many different numbers of zones may be utilized, the present invention utilizes twenty zones of latitudinal dimension 26 and fifty nine zones of longitudinal dimension 27. Each zone of longitudinal dimension 27 is one degree of longitude in dimension. The location cell or address, in terms of its particular latitudinal and longitudinal zone 26 and 27, of a particular signboard 10 is remotely programmed into the memory of control unit 16 by a programming signal directed specifically to that sign board.

Because some of the lighting protocols refer to a particular time of day, as opposed to sunrise or sunset, it is also necessary to program into the memory of control unit 16 by a programming signal the time zone in which the sign board 10 is located.

Timing and event reference signals are broadcast at predetermined times to the common cap address so that they are received and decoded by all control units 16 to establish daily "benchmark" times. Such "benchmark" times may include, for example, sunset and sunrise event signals representing, for example, sunset and sunrise at the intersection of the eastern-most longitudinal zone 27a and each of the latitudinal zones 26, as well as 10 p.m., 12 a.m., 2 a.m. and 5 a.m. time signals representing, for example, local time in the eastern time zone in the continental United States.

Since the geographic location of each sign board 10 is programmed into the memory of its respective control unit 16, control unit 16 can in obtaining the local event or time, reference the "benchmark" time or event and calculate a delay therefrom based upon its particular geographic location or time zone. It will be appreciated that in accordance with the invention, various other "benchmark" times or events may be utilized to control the lighting control units. Henceforth, signals establishing or referring to benchmark times or events will be referred to as "timing reference signals."

In operation, computer 21 calculates the times of sunset and sunrise for the geographic zones defined by the intersection of each zone of latitudinal dimension 26 and the eastern-most zone of longitudinal dimension 27a. It then causes transmitter 20 to transmit a timing signal at each of these times. The timing signal is coded as to its origin so that each control unit 16 can identify the timing signal that corresponds to the zone of latitudinal dimension 26 in which it is located and reference only that timing signal with respect to performing the lighting protocol.

Computer 21 also signals the transmitter 20 when to transmit other timing signals representing a particular time of day in the eastern time zone. To enhance accuracy, the computer may reference the clock at the National Bureau of Standards on a daily basis.

If the signal is a programming signal, control unit 16 must provide within control circuits 23 a means to store the signal in memory. If the signal is a timing reference signal, control unit 16 must provide, with reference to the lighting protocol or mode of operation for which the unit is programmed, initiation of a timing period after which the lighting system will be activated.

Referring to FIG. 3, to perform the above described functions with respect to face 11, control unit 16 may functionally comprise an antenna 30, radio receiver 22, register 25 for storing the twenty-digit data signal, a first comparator 31, a second comparator 32, means for storing in memory a discrete sign address 33, and means for storing in memory a universal sign address 34. In addition, also included are a reference signal buffer 35, a lighting protocol memory 36, a reference signal buffer 37, a programming memory 38, a comparator 40, a fixed comparand 41 and logic gates 42–45. A processor 46 operating in association with a clock circuit 47 utilize the signals stored in buffer 35, memory 36, buffer 37 and memory 38 to provide output signals to the power relay circuit associated with the sign board lighting system 13.

In operation, receiver 22 is connected to register 25, and upon receipt by receiver 22, the twenty-digit data signal transmitted to the receiver is serially transferred into and stored in register 25.

Although various formats are possible, in the embodiment of FIG. 3, the first six digits stored in register 25 are applied to comparators 31 and 32, which simultaneously receive comparands 33 and 34, respectively. Comparator 31 compares the first six digits with the unique sign address 33 of the particular control unit 16. If comparator 31 finds that the first six digits are identical to sign address 33, it enables logic gate 43 to accept a new lighting protocol or operating mode. Each control unit 16 is assigned a unique sign address 33. Although a six digit address is shown, allowing 999,999 sign boards to be uniquely addressed, it will be appreciated that a greater or lesser number of digits may be utilized depending upon the desired capacity of the system.

The first six digits are also compared by comparator 32 with the universal sign address comparand 34, in this case 000000. If comparator 32 finds that the first six digits are identical to the universal sign address 34, it enables logic gates 42 and 44 to load a new reference signal identification in buffers 35 and 37, which enables the control circuit to determine whether to respond for the lighting protocol in effect. The universal sign address 34 is identical for all control units 16 of all sign boards 10 in the system, and thus all control units 16 decode and respond to the timing signals.

Since, in the present invention, six digits are utilized for the sign address 33 and there is one universal sign address 34, 999,999 different sign boards 10 may be controlled within a single system by the embodiment described herein. Since all control units 16 contain the same universal sign address 34, all control units 16 will decode and respond to the reference signal. Conversely, only one control unit 16 contains the unique sign address 33, and consequently, only one control unit 16 will respond and store in memory a programming signal.

The composition of timing reference signals is illustrated in FIG. 4. As shown, the first six digits of a reference signal constitute the universal sign address. The seventh and eighth digits are identical and represent which of the various reference "benchmarks" the timing reference signal represents.

Referring to FIG. 3, for example, if the digits are 2's, the control unit 16 would recognize the timing reference signal as the 10:00 p.m. off signal. If the digits are 1's, the control unit 16 would recognize the timing reference signal as the "sunset on" signal.

The ninth and tenth digits represent the individual zone of latitudinal dimension 26 to which the timing reference signal is referenced. Referring again to FIG. 5, the zones of latitude 26 are numbered consecutively from 1 to 20 starting with the northern-most zone. The eleventh and twelfth digits together represent to which zone of longitudinal dimension 27 the timing signal is referenced, numbered east to west from 1 to 59, or alternatively, the time zone to which the timing signal is referenced. Four standard time zones encompass the continental United States, numbered from east to west 61–64. Four more represent "daylight savings" time zones, numbered east to west 71–74.

Thus, a timing reference signal corresponding to sunset or sunrise in the eastern-most zone of longitudinal dimension 27a will contain a 01 in the eleventh and twelfth digits and numbers in the ninth and tenth digits corresponding to which latitudinal zone 26 the timing signal is referenced. Upon reception of such a timing reference signal, the control unit 16 will interpret the 01 in the eleventh and twelfth digits as representing the time of sunset or sunrise at the eastern-most longitudinal zone 27a. If the ninth and tenth digits correspond to the values for the latitudinal zone 26 in which the sign board 10 is located, the control unit 16 will calculate the necessary delay to compensate for the difference, if any, in the time of sunset or sunrise between its location and the eastern-most zone of longitude 27a. If the ninth and tenth digits do not correspond to the values for the latitudinal zone 26 in which the sign board 10 is located, the control unit 16 will ignore the timing reference signal and await a timing signal having a like latitudinal zone.

If the twenty-digit signal represents a timing reference signal reference transmitted at sunset or sunrise, then control circuit 23, with reference to the transmitted geographic data, and its stored geographic position, utilizes the clock 47 to calculate an appropriate delay, in this case an integral multiple of four minutes for each zone of longitude 27 west of the eastern-most zone of longitude 27a in which the sign board 10 is located. To calculate this delay, the control unit 16 could simply subtract the 01 contained in the eleventh and twelfth digits of the timing reference signal from the number representing the longitudinal zone 27 in which the sign board 10 is located and multiply the result by four to get the appropriate delay in minutes.

If the twenty-digit signal represents a timing reference signal transmitted at a particular time of day, the control circuit with reference to the time zone data, utilizes clock 47 to calculate an appropriate delay, which would be an integral multiple of one hour, based upon the number of time zones west of the eastern-most time zone.

The composition of a programming reference signal is as follows. As previously shown, the first six digits represent the unique sign address for the particular control unit 16 to be programmed. Referring again to FIG. 4, the seventh and eighth digits represent the mode of operation in which the control unit 16 is to operate. Thus, to alter the mode of operation for a particular control unit 16, a programming signal is transmitted wherein the first six digits are the unique sign address for the control unit 16, and the seventh and eighth digits are the new lighting protocol or mode of operation for the first and second faces 11, 12. If it is desired to only alter the mode of operation for one of the faces, a dummy variable, "9" may be utilized for the other face so that the mode of operation for that face is not altered.

To program the geographic location and time zone in which the sign board 10 is located, a programming signal is transmitted containing, for example, four "9"'s in the thirteenth through sixteenth digits, the latitudinal zone 26 in which the sign board 10 is located in the seventeenth and eighteenth digits, and the longitudinal zone 27 in which the sign board 10 is located in the nineteenth and twentieth digits. The four "9"'s are recognized by comparator 40, which enables logic gate 45 to convey the new data into memory 38 for utilization by processor 46.

Although this particular embodiment utilizes four "9"'s in the thirteenth through seventeenth digits, it will be appreciated that only one "9" or some other number in a particular digit would be required to signal the control unit 16 that the programming signal contains information pertaining to the geographic location of the sign board 10. In such a case, the other three digits could be utilized to expand the capacity of the system in several ways. For example, the additional digits could be utilized to contain the mode of operation for additional faces on, for example, a four sided sign board. Another possibility is for the other three digits to be utilized to expand the possible lighting protocols for each face. Since the current embodiment utilizes one digit to code the lighting protocol for a particular face, up to ten protocols may be utilized. If two of the other three digits were utilized to code the lighting protocol for each face, up to 100 protocols could be utilized.

Figure 6:
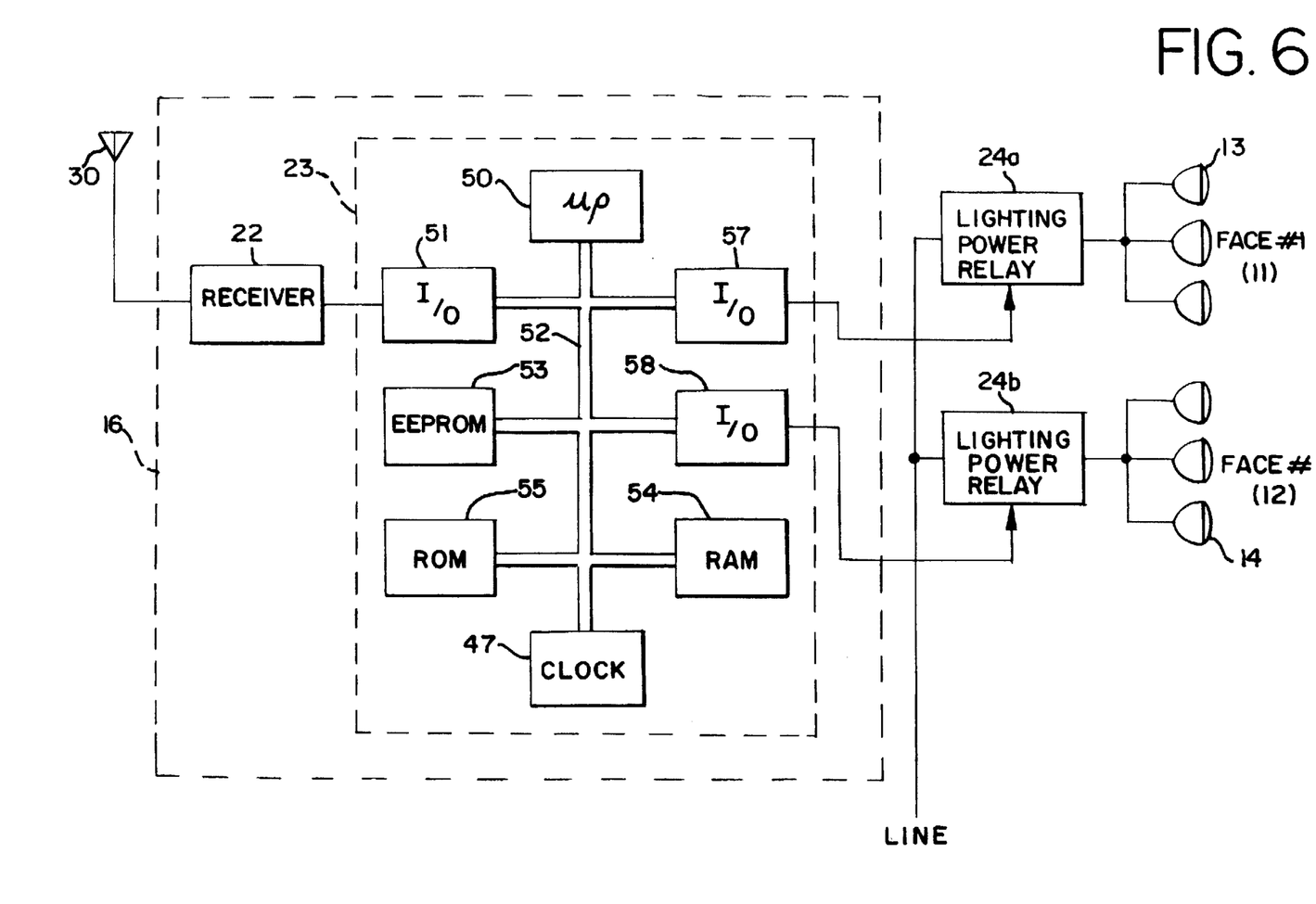
FIG. 6 is a simplified electrical schematic diagram for the lighting system control unit of FIG. 2.
Figure 7:
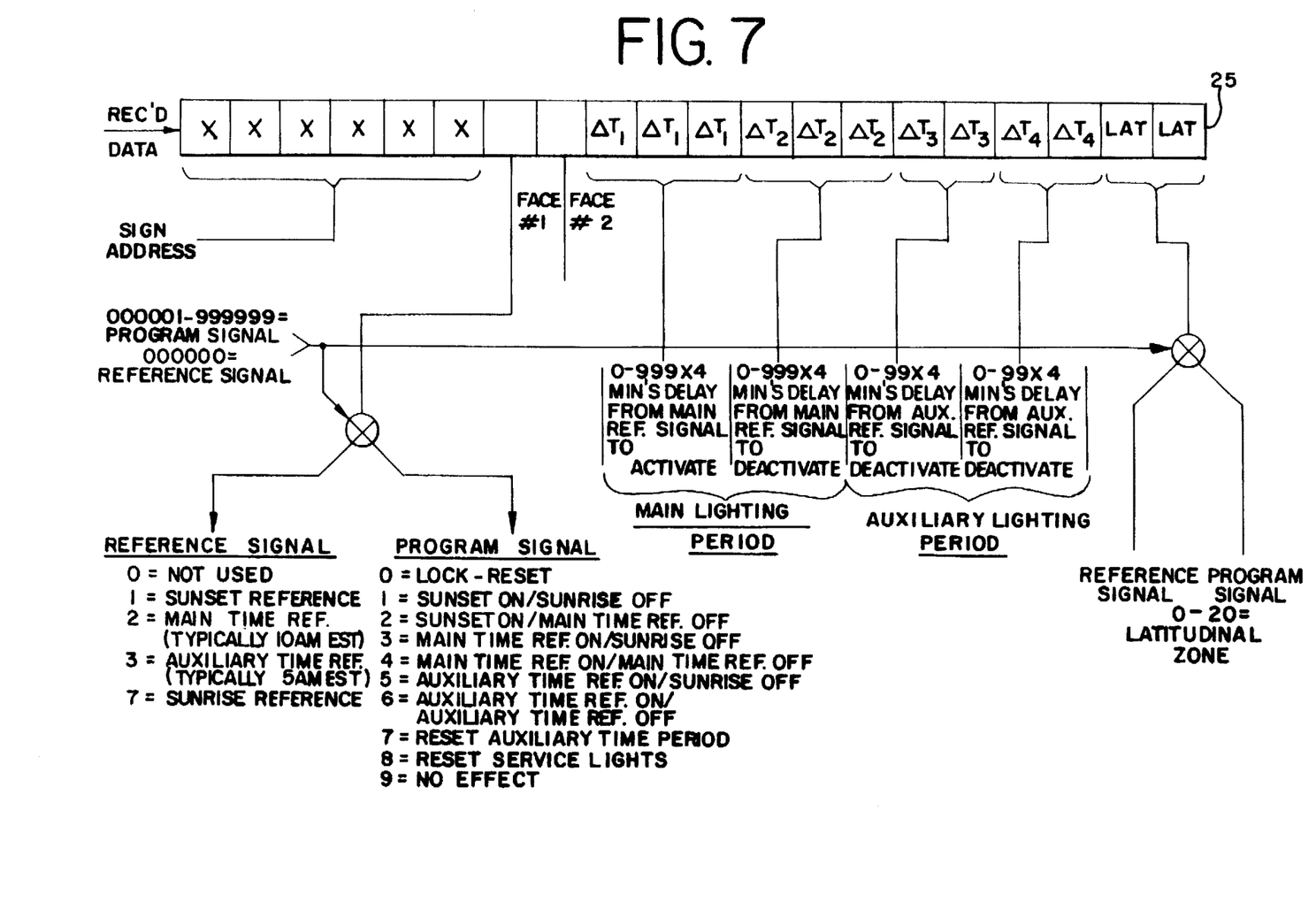
FIG. 7 is a diagram depicting the function of each digit in an exemplary twenty-digit code segment utilized in the control system of FIG. 6.

Referring to FIG. 6, control circuits 23 may be implemented utilizing a microprocessor 50, which may be conventional in design and construction. In the embodiment, radio receiver 22 is connected through an input/output ("I/O") means 51 to a data bus 52, which connects to an electronic erasable programmable read only memory ("EEPROM") device 53, a random access memory ("RAM") device 54, a read only memory ("ROM") device 55, the clock circuit 47 (which may be integral to microprocessor 50), and two (I/O) circuits 57 and 58 connecting the data bus 52 to two input-output power relay circuits 24a and 24b associated with sign board faces 11 and 12, respectively. These circuits act as switch circuits to control the application of electric power to lighting systems 13 and 14.

Upon receipt of a signal, the radio receiver serially transmits the twenty-digit reference signal to RAM 54 and microprocessor 50 via I/O circuit 51 and data bus 52. Microprocessor 50 then signals the EEPROM 53 to transfer to it the sign address 33 for that particular control unit 16. The sign address 33 is programmed into the EEPROM during the manufacture of the control unit 16. The microprocessor unit 50 then also signals EEPROM 53, or alternatively ROM 55, to transfer to it the universal sign address 34. The microprocessor 50 then compares the first six digits of the twenty-digit data stream from the receiver to the sign address 33 and the universal sign address 34 to determine whether the received signal represents a programming signal or a timing reference signal.

If the control unit 16 receives a programming signal, the microprocessor 50 transfers the seventh and eighth digits to EEPROM device 53 (or alternatively the RAM device 54) via data bus 52 for storage in memory. Similarly, upon receipt of a programming transmission containing "9999" in the thirteenth through sixteenth digits, microprocessor 50 transfers the seventeenth through twentieth digits to EEPROM 53 via data bus 52 for storage in memory.

Referring also to FIG. 4, the "sunrise on" and "sunrise off" modes of operation are not programmable. Each is permanently stored in memory, either in ROM 55 or the EEPROM 53. Thus, unless individually programmed in the locked mode, every control unit 16 operates to enable the switch circuits 24a and 24b to connect the lighting systems 13 and 14 to the AC line after an appropriate delay upon receipt of a timing signal at sunset. Similarly, each control unit 16, unless programmed for an early off mode, will deactivate switch circuits 24a and 24b, after an appropriate delay, upon receipt of a timing signal at sunrise.

If control unit 16 receives timing reference signal, then the seventh and eighth digits are transferred via I/O device 51 and the data bus 52 to microprocessor 50. The microprocessor compares the seventh digit and the eighth digit with the values for the digits stored in EEPROM 53 (or alternatively, RAM 54). If either or both of the seventh digit or eighth digit correspond to the values stored in memory, the microprocessor 50 references the geographical data stored in the EEPROM 53 (or alternatively, RAM 54) and calculates the appropriate delay. With reference to the clock 47, the microprocessor, after the appropriate delay, signals the relay circuits 24a and 24b, via data bus and I/O circuit 58, to energize lighting systems 13, 14.

In a successful embodiment of control unit 16, microprocessor 50, I/O devices 51, 57 and 58, RAM 54, ROM 55, EEPROM 53 and data bus 52 may be contained on a single or multiple CMOS integrated circuit. This provides increased reliability by obviating the need for discreet circuitry for the included circuit stages.

It will be appreciated that other forms of programming signals can be supplied to the lighting control units to achieve the same result. Various methods may be utilized to enhance the reliability of the system. Multiple computer systems 21 located in different geographic locations controlling different transmitters 20 will provide system redundancy in the event of a failure of the primary transmitter 20 or computer 21. Additionally, standard timers and photocells may be utilized to back-up the system is the event of a failure of control unit 16. Another safeguard would be for the system, in the event control unit 16 does not receive any pages in a twenty four hour period, to revert to the operational mode utilized during the previous twenty four hours. In such a case, sunset or sunrise timing functions would contain a slight error, which would aggregate daily; however, the system would continue to operate approximately correctly until it could be repaired.

It will be appreciated that other forms of programming signals can be supplied to the control units 16 to achieve the same result. For example, each lighting unit could be supplied, as part of the programming signal, with a number calculated by the central computer 21 representing the number of minutes delay required between sunset at the reference location, as before the eastern-most longitudinal zone. Sunrise and sunset functions could then be simply conducted by timing from the corresponding one of the twenty latitudinal zone time signals.

Moreover, lighting protocols based on local time could be accomplished by instituting a delay period from, for example, a single 10:00 p.m. EST time signal, representing the earliest possible turn-off under any mode. The time delay required would be calculated by the central computer and conveyed to each lighting control unit as part of the twenty digit programming signal in the form of a number representing the number of minutes in the delay period.

In this way, all calculations would be carried out at the central computer and microprocessor 50 would be required only to recognize the various programming and reference signals and initiate preset timing period from a timing reference signal as instructed.

Figure 8:
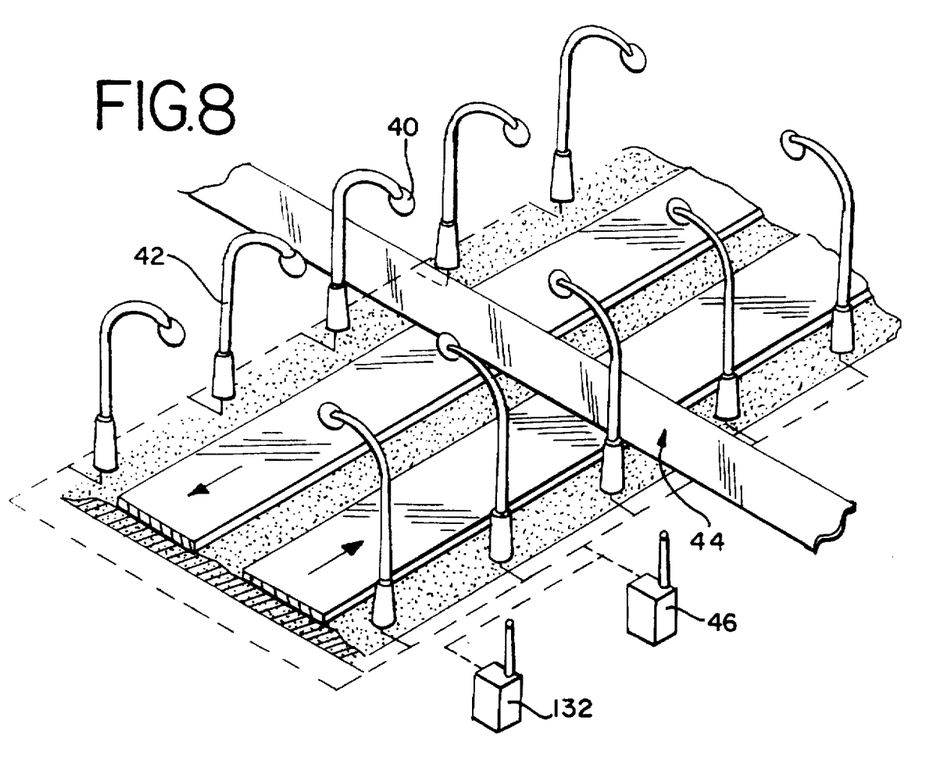
FIG. 8 is a perspective view of an intersection of two roads equipped with lamp posts controlled by the lighting control system in accordance with the present invention.

Referring now to FIG. 8, an exemplary highway lighting system has a plurality of lights 40 mounted on light posts 42 positioned to illuminate the highway intersection 44 which operate from a conventional AC power source. The operation of the lighting system is controlled by a control unit 46. Although it is not necessary, it may be desirable to allocate each of the plurality of lights 40 to either a primary lighting system or auxiliary lighting system. In such a case, all the lights may be activated during high traffic times by activating both the primary and auxiliary system, and only a portion may be activated at other times, such as the early morning hours, by turning off the auxiliary system. A response transmitter 132 provides signaling to the control center of lighting status.

Figure 9:
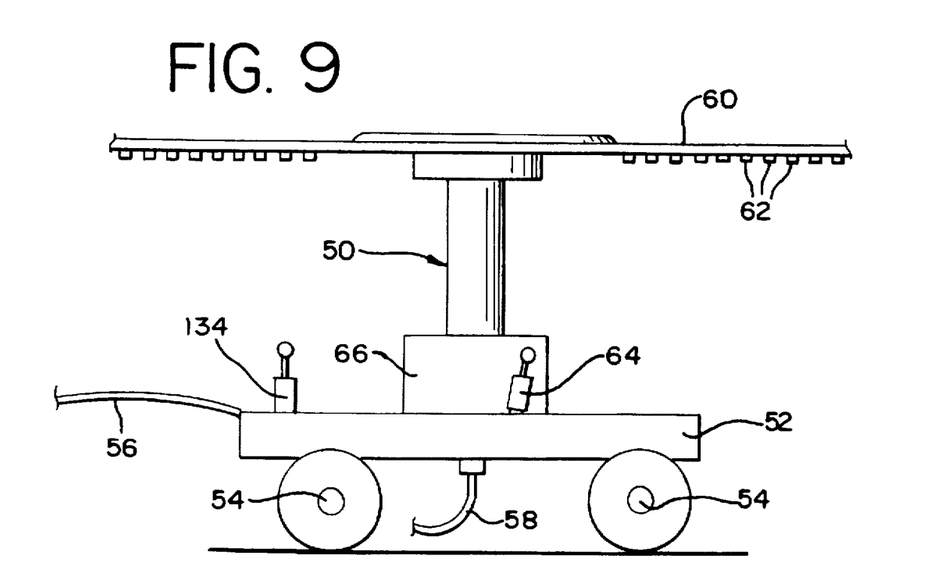
FIG. 9 is an elevated side view of an irrigation boom vehicle equipped with an electronic controller in accordance with the present invention.

Referring now to FIG. 9, a mobile irrigation boom vehicle 50 is illustrated including a lower chassis portion 52 equipped with wheels 54 and a towing hitch 56 for pulling by a tractor or the like. A hose connection 58 is provided for releasably connecting an upper boom arm portion 60 having spray nozzles 62 arrayed therealong to a source of pressurized water. A remote control unit 64 including receiver means is provided which in turn is connected to a solar or battery-powered on/off valving means (not shown) within the base housing 66. Control units 64 on a plurality of booms 50 are addressed in accordance with the present invention by a common control transmission means which sends reference signals and programming signals as necessary to all of booms 50 to turn some or all of the irrigation booms on and off at appropriate predetermined times of night, as discussed above. A response transmitter 134 provides signaling to the control center of irrigation system operation.

While particular embodiments of the invention have been shown and described, it will be obvious to those skilled in the art that changes and modifications may be made therein without departing from the invention in its broader aspects, and, therefore, the aim of the appended claims is to cover all such changes and modifications as fall within the true spirit and scope of the invention.

For example, while the particular embodiments of the invention described above has described a twenty-digit programming or reference code, each digit of which represents particularly described data, it will be obvious to those skilled in the art that changes and modifications may be made with respect to the length of the transmitted code, the particular data represented by each digit and the order of the digits therein without departing from the invention in its broader aspects, and, therefore, the aim of the appended claims is to cover all such changes and modifications as fall within the true spirit and scope of the invention.

What is claimed is:

1. A system for controlling the operation of an electrical apparatus, said system comprising:

a system control center for controlling a control unit remotely located from said control center and associated with an electrical apparatus in accordance with an individual operating protocol of said control unit, said system control center including memory means containing said operating protocol;

transmission means associated with said system control center for transmitting a programming signal to said control unit designating said operating protocol and a geographical location of said control unit and for further transmitting a timing reference signal to said control unit designating the occurrence of an event at a benchmark geographical location;

said control unit including receiver means for receiving said timing reference signal;

timing means associated with said control unit and responsive to said timing reference signal for initiating a timing period having a duration determined based upon the relation between said benchmark geographical location and said geographical location of said control unit;

control circuit means responsive to expiration of said timing period for controlling the application of operating current to electrical circuitry within said electrical apparatus; and a response transmitter responsive to the operation of said control circuit means for selectively transmitting at least one answer back message to a receiving unit associated with said system control command center for comparison with said stored protocol, whereby said electrical apparatus is verifiably operated in accordance with said operating protocol.

2. A system for controlling an electrical apparatus as defined in claim 1 wherein said transmission means and said receiver means comprise conventional paging or two-way radio systems.

3. A system for controlling an electrical apparatus as defined in claim 1 wherein said timing reference signal is transmitted by said transmission means at a predetermined time corresponding to the setting of a sun relative to a predetermined geographic location.

4. A system for controlling an electrical apparatus as defined in claim 3 wherein said timing means comprises a microprocessor device.

5. A system for controlling an electrical apparatus as defined in claim 1 wherein said programming signal includes an address unique to said electrical apparatus.

6. A system for controlling an electrical apparatus as defined in claim 1 wherein said electrical apparatus has a plurality of operating functions and wherein the operation of at least one of said operating functions is independently controlled.

7. A system for controlling an electrical apparatus as defined in claim 1 wherein said receiving unit associated with said system control center comprises a relay station including means for receiving answer back messages from nearby operation control units and means for relaying the received answer back messages to a remote system control command center.

8. A system for controlling an electrical apparatus as defined in claim 1 wherein said answer back message includes an acknowledgement signal component indicating that the time reference signal or the programming signal was properly received by the receiving means associated with the operation control unit.

9. A system for controlling an electrical apparatus as defined in claim 8 wherein said answer back message includes an autodiagnostic status report signal component indicative of a current status of the electrical apparatus.

10. A system for controlling an electrical apparatus as defined in claim 1 wherein said answer back message includes an identifying address code component identifying the electrical apparatus and operation control unit from which the answer back message is being transmitted.

11. A system for controlling an electrical apparatus as defined in claim 1 wherein transmission of said answer back message follows a second predetermined timing period responsive to a received signal selected from received time reference signals, received protocol programming signals and combinations of the foregoing signals.

12. A system for controlling an electrical apparatus as defined in claim 11 wherein said second predetermined timing period is dependent upon the geographic location of said electrical apparatus.

13. A system for controlling an electrical apparatus as defined in claim 1 wherein said timing reference signal is transmitted by said transmission means at a predetermined time corresponding to a rising of a sun relative to a predetermined geographic location.

14. A system for controlling an electrical apparatus as defined in claim 1 wherein a communications link selected from the group consisting essentially of radio, paging, telephone, modem and fax communications links communicates said response transmitter associated with said operation control unit with said receiving unit associated with said system control center.

15. A system for controlling the operation of multiple electrical apparatuses, said system comprising:

a system control center for controlling a control unit remotely located from said control center and associated with an electrical apparatus in accordance with an individual operating protocol of said control unit;

transmission means associated with said system control center for transmitting a programming signal to said control unit designating said operating protocol and a geographical location of said control unit and for further transmitting a timing reference signal to said control unit designating the occurrence of an event at a benchmark geographical location;

said control unit including receiver means for receiving said timing reference signals;

timing means responsive to said reference signal for initiating a predetermined timing period having a duration determined based upon the relation between said benchmark geographical location and said geographical location of said control unit;

control circuit means responsive to said timing means for controlling the application of operating current to said apparatus following expiration of said timing period; and a response transmitter associated with said control unit for selectively transmitting at least one answer back message at an assigned time in response to a received reference signal to a receiving unit associated with the system control center, whereby the apparatus is caused to be verifiably operated in accordance with its respective operating protocol.

16. A system for controlling the operation of multiple electrical apparatuses as defined in claim 15 wherein said timing means is effective to initiate a second predetermined timing period and said operation control unit further comprises an autodiagnostic status check circuit means responsive to said second predetermined timing period.

17. A system for controlling an electrical apparatus as defined in claim 15 wherein the electrical apparatuses are disposed in a plurality of diverse geographic locations and wherein said timing period of each said electrical apparatus is dependent upon the geographic location of said electrical apparatus.

18. A system for controlling an electrical apparatus as defined in claim 15 wherein said transmission means and said receiver means comprise conventional paging or two-way radio systems.

19. A system for controlling an electrical apparatus as defined in claim 15 wherein said reference signal is transmitted by said transmission means at a predetermined time corresponding to a setting of a sun relative to a predetermined geographic location.

20. A system for controlling an electrical apparatus as defined in claim 15 wherein each said reference signal includes an address unique to said electrical apparatus.

21. A system for controlling an electrical apparatus as defined in claim 15 wherein said reference signal is transmitted by said transmission means at a predetermined time corresponding to a rising of a sun relative to a predetermined geographic location.

22. A control device operable from a received timing reference signal for controlling the operation of an electrical apparatus, comprising:

means for storing an operating protocol for said control device and data indicative of the geographical location of said control device;

receiver means for receiving at least one timing reference signal transmitted upon the occurrence of an event at a benchmark geographical location;

timing means responsive to said received timing reference signal for initiating at least one predetermined timing period having a duration based upon the relation between said benchmark geographical location and said geographical location of said control device;

apparatus control circuit means responsive to said timing means for controlling the application of operating current to operating means of said electrical apparatus following said timing period;

autodiagnostic circuit means responsive to said timing means for performing a status check of said apparatus and for preparing an autodiagnostic status report indicative of a current status of said electrical apparatus; and an answer back communications link for automatically providing an answer back message including said autodiagnostic status report to a remote control command center, whereby said electrical apparatus is caused to be verifiably operated in accordance with its operating protocol.

23. A control device as defined in claim 22 wherein the electrical apparatus is one of a plurality of electrical apparatuses disposed in a plurality of diverse geographic locations, said reference signal controls a plurality of said electrical apparatuses, and wherein said predetermined timing period is dependent upon the geographic location of said electrical apparatus.

24. A control device as defined in claim 22 wherein said reference signal is transmitted at a predetermined time corresponding to a setting of a sun relative to a predetermined geographic location.

25. A control device as defined in claim 22 wherein said electrical apparatus has a plurality of operating functions and wherein the operation of at least one of said operating functions is independently controlled by said received reference signal.

26. A control device as defined in claim 22 wherein said reference signal is transmitted at a predetermined time corresponding to a rising of a sun relative to a predetermined geographic location.

27. A method for controlling the operation of a selected set of a plurality of electrical apparatuses, comprising the steps of:
  storing a predetermined individual operating protocol associated to each of said plurality of electrical apparatuses, each said operating protocol having predetermined on and off times,
  transmitting at least one timing reference signal to said plurality of electrical apparatuses upon the occurrence of an event at a benchmark geographical location;
  receiving a transmitted timing reference signal at said selected set of said plurality of said electrical apparatuses;
  initiating a timing period at each apparatus of said selected set in response to the received reference signal, the timing period initiated at each apparatus having a duration based upon the relation between the benchmark geographical location and the geographical location of that particular apparatus;
  controlling the application of operating current to the operating means of each apparatus of said selected set following expiration of said timing period;
  initiating a second timing period at each apparatus of said selected set in response to the received reference signal; and
  transmitting at least one answer back message from each electrical apparatus of said selected set to a remote command center following said second timing period of each electrical apparatus of said second set, said answer back message including an acknowledgement component indicating receipt of the reference signal at each electrical apparatus of said selected set whereby each electrical apparatus of said selected set is caused to be verifiably operated in accordance with its predetermined operating protocol.

28. A system for controlling the operation of an electrical apparatus, said system comprising:
  a system control center for controlling a control unit remotely located from said control center and associated with an electrical apparatus in accordance with an individual protocol of said control unit, said system control center including memory means containing said operating protocol;
  transmission means associated with said system control center for transmitting a programming signal to said control unit designating said operating protocol and a geographical location of said control unit and for further transmitting a timing reference signal to said control unit designating the occurrence of an event at a benchmark geographical location;
  said control unit including receiver means for receiving said timing reference signal;
  timing means associated with said control unit and responsive to said timing reference signal for initiating a timing period having a duration determined based upon the relation between said benchmark geographical location and said geographical location of said control unit; and
  control circuit means responsive to expiration of said timing period for controlling the application of operating current to electrical circuitry within said electrical apparatus.

29. A system for controlling an electrical apparatus as defined in claim 28 wherein said transmission means and said receiver means comprise conventional paging or two-way radio systems.

30. A system for controlling an electrical apparatus as defined in claim 28 wherein said programming signal includes an address unique to said electrical apparatus.

31. A system for controlling an electrical apparatus as defined in claim 28 wherein said timing means comprises a microprocessor device.

32. A system for controlling an electrical apparatus as defined in claim 28 wherein said electrical apparatus has a plurality of operating functions and wherein the operation of at least one of said operating functions is independently controlled.

33. A system for controlling the operation of multiple electrical apparatuses, said system comprising:
  a system control center for controlling a control unit remotely located from said control center and associated with an electrical apparatus in accordance with an individual operating protocol of said control unit;
  transmission means associated with said system control center for transmitting a programming signal to said control unit designating said operating protocol and a geographical location of said control unit and for further transmitting a timing reference signal to said control unit designating the occurrence of an event at a benchmark geographical location;
  said control unit including receiver means for receiving said timing reference signal;
  timing means responsive to said reference signal for initiating a predetermined timing period having a duration determined based upon the relation between said benchmark geographical location and said geographical location of said control unit; and
  control circuit means responsive to said timing means for controlling the application of operating current to said apparatus following expiration of said timing period.

34. A control device operable from a received timing reference signal for controlling the operation of an electrical apparatus, comprising:
  means for storing an operating protocol for said control device and data indicative of the geographical location of said control device;
  receiver means for receiving at least one timing reference signal transmitted upon the occurrence of an event at a benchmark geographical location;

timing means responsive to said received timing reference signal for initiating at least one predetermined timing period having a duration based upon the relation between said benchmark geographical location and said geographical location of said control device; and apparatus control circuit means responsive to said timing means for controlling the application of operating current to operating means of said electrical apparatus following said timing period.

35. A method for controlling the operation of a select set of a plurality of electrical apparatuses, comprising the steps of:

storing a predetermined individual operating protocol associated to each of said plurality of electrical apparatuses, each said operating protocol having a predetermined on and off time;

transmitting at least one timing reference signal to said plurality of electrical apparatuses upon the occurrence of an event at a benchmark geographical location;

receiving a transmitted timing reference signal at said selected set of said plurality of said electrical apparatuses;

initiating a timing period at each apparatus of said selected set in response to the received reference signal, the timing period initiated at each apparatus having a duration based upon the relation between the benchmark geographical location and the geographical location of that particular apparatus; and controlling the application of operating current to the operating means of each apparatus of said selected set following expiration of said timing period.

* * * * *